US012798500B2

(12) United States Patent
Fujimoto

(10) Patent No.: US 12,798,500 B2
(45) Date of Patent: Nov. 17, 2026

(54) VEHICLE

(71) Applicant: SUBARU CORPORATION, Tokyo (JP)

(72) Inventor: Daiya Fujimoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 93 days.

(21) Appl. No.: 18/923,839

(22) Filed: Oct. 23, 2024

(65) Prior Publication Data

US 2025/0145094 A1 May 8, 2025

(30) Foreign Application Priority Data

Nov. 7, 2023 (JP) ................................ 2023-190420

(51) Int. Cl.
*B60R 16/023* (2006.01)
*H04L 12/40* (2006.01)
*H04W 4/40* (2018.01)

(52) U.S. Cl.
CPC ............ *B60R 16/023* (2013.01); *H04L 12/40* (2013.01); *H04W 4/40* (2018.02); *H04L 2012/40215* (2013.01)

(58) Field of Classification Search
CPC .................................................. B60R 16/023
See application file for complete search history.

(56) References Cited

U.S. PATENT DOCUMENTS 9,432,207 B2 * 8/2016 Seo ......................... H04L 12/66
12,347,249 B2 * 7/2025 Odawara .............. G07C 5/0808
12,549,275 B2 * 2/2026 Nagura ................. H04L 1/0008
2018/0139072 A1 * 5/2018 Komano ................. H04L 12/40
2022/0286321 A1 * 9/2022 Yamada ............ H04L 12/40169
2025/0132948 A1 * 4/2025 Fujimoto .......... H04L 12/40006
2025/0145094 A1 * 5/2025 Fujimoto ................ H04L 12/40
2025/0244996 A1 * 7/2025 Tateishi .................. B60R 16/02

FOREIGN PATENT DOCUMENTS

JP 2020-167573 A 10/2020

* cited by examiner

*Primary Examiner* — Michael A Berns
(74) *Attorney, Agent, or Firm* — TROUTMAN PEPPER LOCKE LLP

(57) ABSTRACT

A vehicle includes a target unit and an intermediate unit including a first unit and a target unit that mediates communication between a communication apparatus and the target unit. The first unit includes at least one first processor and at least one first memory. The second unit includes at least one second processor and at least one second memory. The intermediate unit includes at least one third processor and at least one third memory. The first memory includes a first receive memory. The second memory include a second receive memory smaller than the first receive memory. The third processor performs: transmitting a first message from the communication apparatus to the first unit without dividing the message when a destination is the first unit; and generating divided messages by dividing the first message and successively transmitting the messages to the second unit when the destination is the second unit.

8 Claims, 7 Drawing Sheets

| TYPE OF TARGET UNIT | RECEIVE MEMORY SIZE |
|---|---|
| FIRST TARGET UNIT | 64 BYTES |
| SECOND TARGET UNIT | 8 BYTES |
| ⋮ | ⋮ |

VEHICLE

CROSS-REFERENCE TO RELATED APPLICATION

The present application claims priority from Japanese Patent Application No. 2023-190420 filed on Nov. 7, 2023, the entire contents of which are hereby incorporated by reference.

BACKGROUND

The disclosure relates to a vehicle.

Japanese Unexamined Patent Application Publication No. 2020-167573 discloses a technique of using an external apparatus coupled to a vehicle to diagnose malfunction of various electronic devices provided to the vehicle.

SUMMARY

An aspect of the disclosure provides a vehicle configured to be coupled to a communication apparatus. The vehicle includes a target unit and an intermediate unit. The target unit is provided to the vehicle and includes a first target unit and a second target unit. The intermediate unit is provided to the vehicle and is configured to mediate communication between the communication apparatus and the target unit. The first target unit includes one or more first target unit processors and one or more first target unit memories coupled to the one or more first target unit processors. The second target unit includes one or more second target unit processors and one or more second target unit memories coupled to the one or more second target unit processors. The intermediate unit includes one or more intermediate unit processors and one or more intermediate unit memories coupled to the one or more intermediate unit processors. The one or more first target unit memories include a first receive memory of a first memory size. The one or more second target unit memories include a second receive memory of a second memory size smaller than the first memory size. The one or more intermediate unit processors are configured to perform a process including: in response to receiving a first message from the communication apparatus, transmitting the first message to the first target unit without dividing the first message when a destination is the first target unit; and in response to receiving the first message from the communication apparatus, generating first divided messages obtained by division of the first message and successively transmitting the first divided messages to the second target unit when the destination is the second target unit.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

Communication between an external apparatus coupled to a vehicle and various electronic devices provided to the vehicle is performed in the related art through transmission of a message from the external apparatus to the various electronic devices and transmission of a message from the various electronic devices to the external apparatus.

The data size of a message receivable at one time may depend on the memory size of each electronic device provided to the vehicle. If the data size of a message receivable by an electronic device at one time is relatively small, a message transmitted from an external apparatus to the electronic device may be hampered from being conveyed as intended. In such a case, a diagnosis of malfunction is difficult to perform, which is likely to cause inconvenience to a user.

It is desirable to enhance convenience in communication between a vehicle and a communication apparatus.

An embodiment of the disclosure will be described in detail hereinafter with reference to the attached drawings. Dimensions, materials, numerical values, and other parameters provided in the embodiment are merely examples for easy understanding of the disclosure and are not intended to limit the disclosure, unless otherwise specified. In the specification and the drawings, elements that have substantially the same functions and constructions are denoted by the same symbols and are not redundantly described, and elements not directly relevant to the disclosure are omitted from the drawings.

Figure 1:
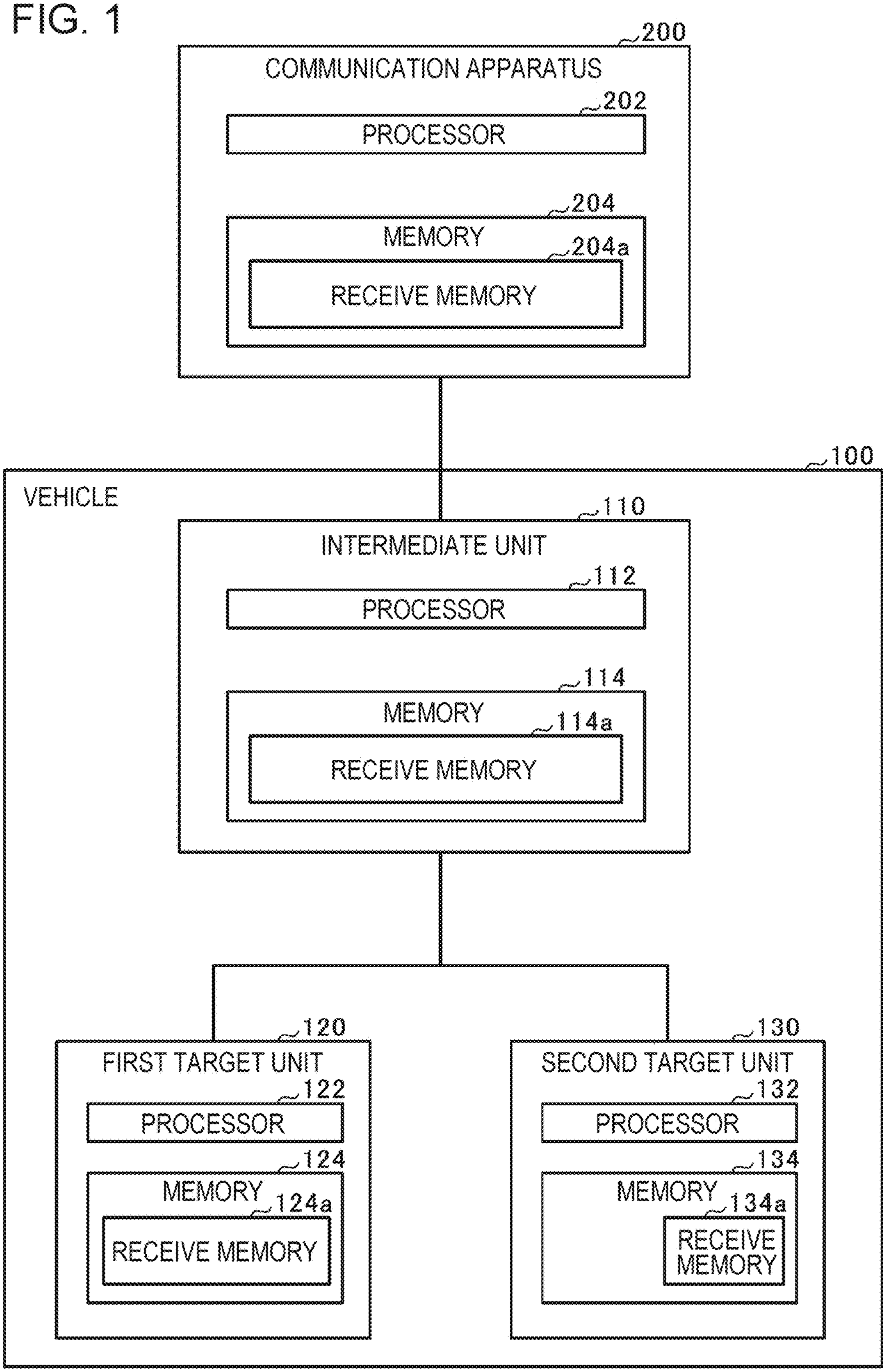
FIG. 1 is a functional block diagram for describing a vehicle according to an embodiment of the disclosure.

FIG. 1 is a functional block diagram for describing a vehicle 100 according to the embodiment of the disclosure. The vehicle 100 is, for example, a hybrid automobile including an engine and a motor as a power source for running.

As illustrated in FIG. 1, the vehicle 100 includes an intermediate unit 110, a first target unit 120, and a second target unit 130.

A communication apparatus 200 is a dedicated terminal such as a malfunction diagnosis terminal to diagnose malfunction of the vehicle 100. Examples of the communication apparatus 200 include a personal computer. When coupled to the vehicle 100, the communication apparatus 200 is able to communicate bidirectionally with the first target unit 120 and the second target unit 130 via the intermediate unit 110. Communication between the communication apparatus 200, the intermediate unit 110, the first target unit 120, and the second target unit 130 may be performed using, for example, a controller area network (CAN) protocol. In the embodiment, description will be given with regard to a case where the communication apparatus 200 is coupled to the vehicle 100 by wireline communication, but the communication apparatus 200 may be wirelessly coupled to the vehicle 100.

In the following description, the first target unit 120 and the second target unit 130 are also collectively referred to as a "target unit" in an abstract way. Examples of such a target unit may include controllers of various electronic devices provided to the vehicle 100. Examples of the target unit include an engine controller configured to control an engine. Examples of the target unit include a motor controller configured to control a motor. Examples of the target unit include a battery controller configured to control a battery. Examples of the target unit include a wireless communicator configured to wirelessly communicate with a data center outside the vehicle 100. Examples of the target unit include a car navigation system controller configured to control a car navigation system. Examples of the target unit include an autonomous driving controller configured to control autonomous driving of the vehicle 100.

In the embodiment, description will be given with regard to a case where a single first target unit 120 is disposed, but the number of the first target units 120 is not limited to one. In other words, the number of the first target units 120 may be any number equal to or more than one.

In the embodiment, description will be given with regard to a case where a single second target unit 130 is disposed, but the number of the second target units 130 is not limited to one. In other words, the number of the second target units 130 may be any number equal to or more than one.

As illustrated in FIG. 1, the first target unit 120 includes one or more processors 122 and one or more memories 124 coupled to the one or more processors 122. Examples of the one or more processors 122 include a central processing unit (CPU). Examples of the one or more memories 124 include a read-only memory (ROM) and a random-access memory (RAM). The ROM is a storing device configured to store a program and data such as computation parameters to be used by the CPU. The RAM is a storing device configured to temporarily store data such as variables and parameters to be used for processing executed by the CPU.

A receive memory 124*a* of a first memory size is disposed in the one or more memories 124 to receive via the intermediate unit 110 various messages transmitted from the communication apparatus 200. In the following description, each of the various messages transmitted from the communication apparatus 200 to the target unit via the intermediate unit 110 is collectively referred to as a first message. Each of the various messages transmitted from the target unit to the communication apparatus 200 via the intermediate unit 110 is collectively referred to as a second message.

The first target unit 120 is able to receive a first message of a length of data (simply referred to as a data length, hereinafter) equal to or less than the value of the first memory size. In the embodiment, description will be given with regard to a case where the first memory size is 64 bytes and the data length of a first message receivable by the first target unit 120 at one time is equal to or less than 64 bytes by way of illustration and not by way of limitation.

As illustrated in FIG. 1, the second target unit 130 includes one or more processors 132 and one or more memories 134 coupled to the one or more processors 132. Examples of the one or more processors 132 include a CPU. Examples of the one or more memories 134 include a ROM and a RAM.

A receive memory 134*a* of a second memory size is disposed in the one or more memories 134 to receive via the intermediate unit 110 a first message transmitted from the communication apparatus 200. The second target unit 130 is able to receive a first message of a data length equal to or less than the value of the second memory size. In the embodiment, description will be given with regard to a case where the second memory size is 8 bytes and the data length of a first message receivable by the second target unit 130 at one time is equal to or less than 8 bytes by way of illustration and not by way of limitation. In other words, the second memory size is simply smaller than the first memory size.

As illustrated in FIG. 1, the intermediate unit 110 includes one or more processors 112 and one or more memories 114 coupled to the one or more processors 112. Examples of the one or more processors 112 include a CPU. Examples of the one or more memories 114 includes a ROM and a RAM.

A receive memory 114*a* is disposed in the one or more memories 114 to receive various messages transmitted from the communication apparatus 200 to the target unit or transmitted from the target unit to the communication apparatus 200. The memory size of the receive memory 114*a* is sufficiently larger than the first memory size and the second memory size described above. In the embodiment, description will be given with regard to a case where the memory size of the receive memory 114*a* is 128 bytes by way of illustration and not by way of limitation.

Figures 2, 3:
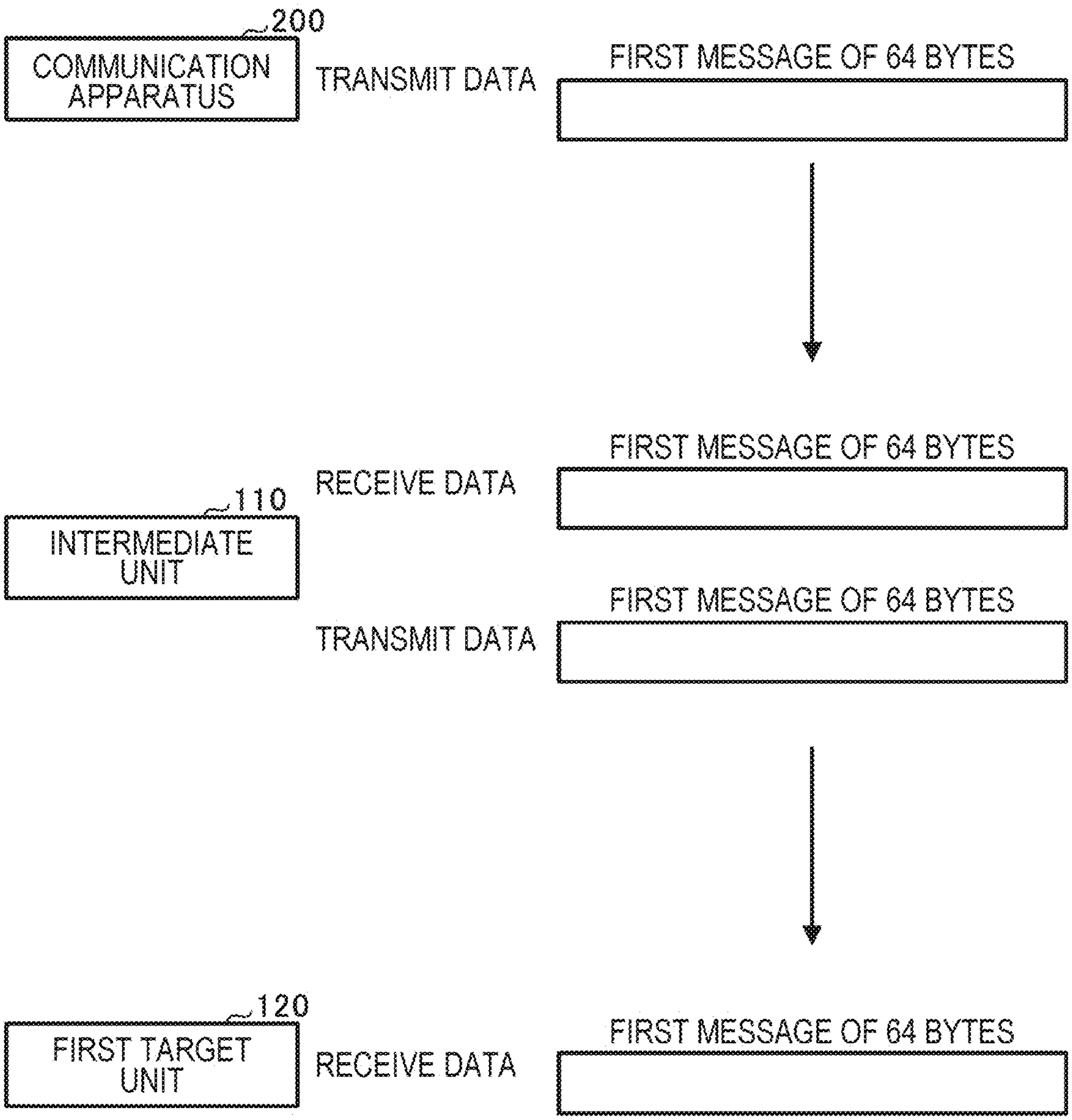
FIG. 2 is an illustration for describing memory size information according to the embodiment of the disclosure.
FIG. 3 is an illustration for describing a case where a communication apparatus transmits a first message to a first target unit according to the embodiment of the disclosure.

In the embodiment, the one or more memories 114 are configured to store memory size information. FIG. 2 is an illustration for describing the memory size information according to the embodiment of the disclosure. As illustrated in FIG. 2, the memory size of the receive memory in each type of target unit is stored in the memory size information.

The intermediate unit 110 is configured to, in response to receiving a first message from the communication apparatus 200, generate multiple divided messages by dividing the received message based on the type of the destination target unit, and details will be described below. In the following description, each message obtained by division of the first message is collectively referred to as a first divided message. Each message obtained by division of the second message is collectively referred to as a second divided message.

The intermediate unit 110 is configured to successively transmit generated first divided messages to the destination target unit at predetermined intervals each sufficiently long to allow readout of a message of the memory size of the receive memory in the destination target unit. The intermediate unit 110 is configured to, in response to receiving multiple second divided messages from the target unit, generate a combined message by combining the multiple second divided messages and transmit the combined message to the communication apparatus 200. Header information indicating the data length of a message is attached to the leading part of the first message and to the leading part of the second message. The first divided messages obtained by division of the first message contain the same header information as the first message before division. The second divided messages obtained by division of the second message contain the same header information as the second message before division. Accordingly, the intermediate unit 110 is able to determine based on the data length indicated by the header information whether a received message is a divided message, in other words, whether the receiving procedure is completed by the most recently received message or whether a message to be received still remains.

The intermediate unit 110 may be configured to create and update the memory size information based on the memory sizes of the receive memories in the target unit provided to the vehicle 100. The intermediate unit 110 may be configured to create and update the memory size information at a predetermined time, such as the start of the engine, based on the memory size of each of the receive memories in the target unit provided to the vehicle 100.

As illustrated in FIG. 1, the communication apparatus 200 includes one or more processors 202 and one or more memories 204 coupled to the one or more processors 202. Examples of the one or more processors 202 include a CPU. Examples of the one or more memories 204 includes a ROM and a RAM.

A receive memory 204*a* is disposed in the one or more memories 204 in the communication apparatus 200 to receive via the intermediate unit 110 a second message transmitted from the target unit. The memory size of the receive memory 204*a* is sufficiently larger than the first memory size and the second memory size described above. In the embodiment, for example, description will be given with regard to a case where the memory size of the receive memory 204*a* is 128 bytes by way of illustration and not by way of limitation. In other words, the memory size of the receive memory 204*a* in the communication apparatus 200 may be larger or smaller than the memory size of the receive memory 114*a* in the intermediate unit 110.

As described above, in the embodiment, the vehicle 100 includes the first target unit 120 capable of receiving a message of the data length equal to or less than 64 bytes at one time and the second target unit 130 capable of receiving a message of the data length equal to or less than 8 bytes at one time.

For example, when the communication apparatus 200 transmits a first message of a data length of 64 bytes to the second target unit 130, the data length of the first message exceeds the maximum value of the data length of a message receivable by the second target unit 130 at one time. In such a case, the inability of the second target unit 130 to receive the first message may hamper the content of the first message from being conveyed as intended.

When the content of the first message is not conveyed as intended, an accurate diagnosis of malfunction is difficult to perform in the communication apparatus 200, which is likely to cause inconvenience to a user. Accordingly, in the embodiment, the intermediate unit 110 is configured to appropriately divide the received first message and transmit the divided messages to the destination so that communication between the communication apparatus 200 and the target unit is properly performed. Since the possibility of hampering the first message from being conveyed as intended is reduced in this way, the possibility of hampering accurate diagnosis of malfunction from being performed is reduced, enabling improvement in the user's convenience.

Figure 4:
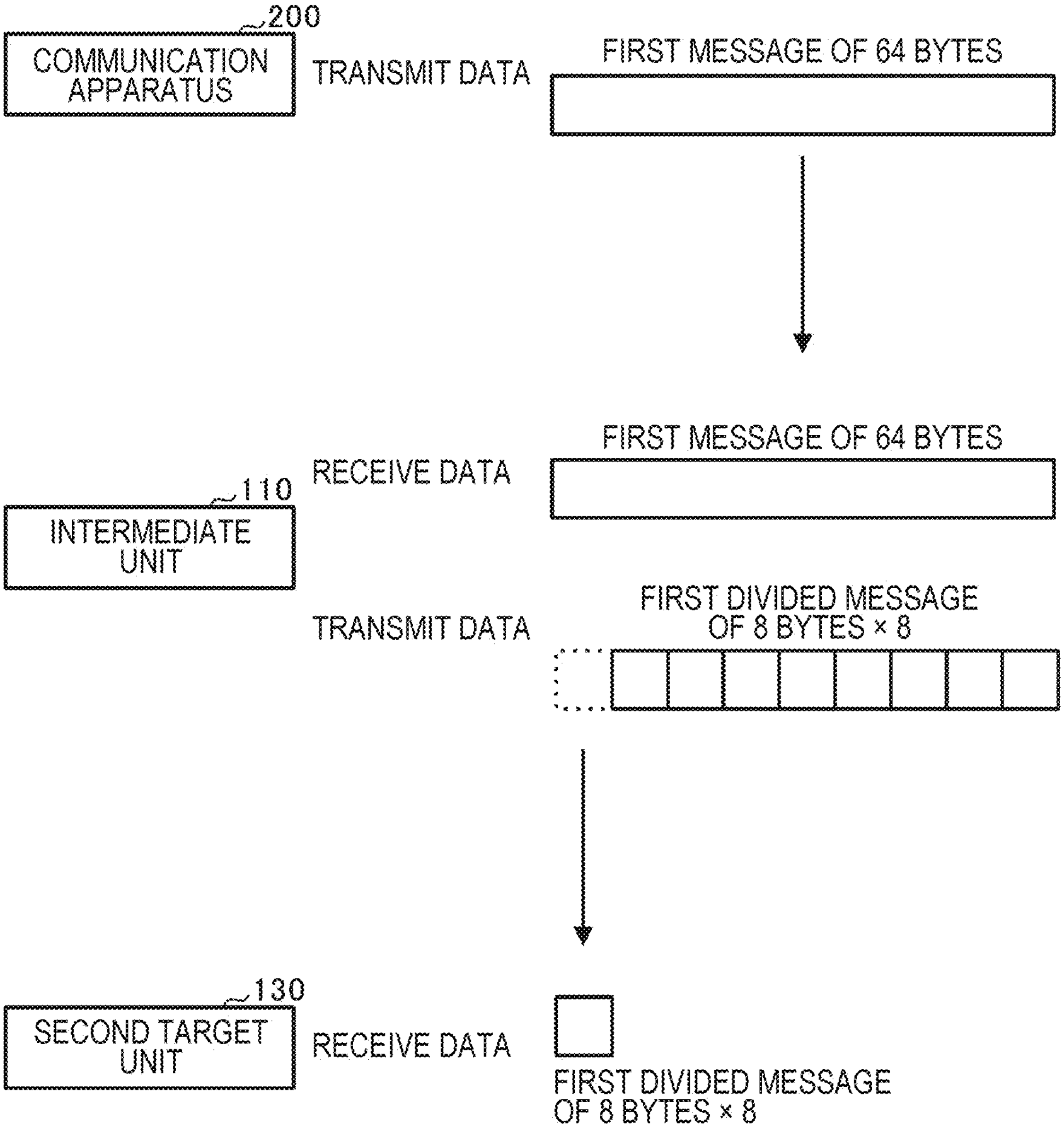
FIG. 4 is an illustration for describing a case where the communication apparatus transmits a first message to a second target unit according to the embodiment of the disclosure.

FIG. 3 is an illustration for describing a case where the communication apparatus 200 transmits a first message to the first target unit 120 according to the embodiment of the disclosure. FIG. 4 is an illustration for describing a case where the communication apparatus 200 transmits a first message to the second target unit 130 according to the embodiment of the disclosure. The communication apparatus 200 is assumed to transmit a first message of 64 bytes to a destination, which is the target unit. In response to receiving the first message, the intermediate unit 110 refers to the memory size information and checks the memory size of the receive memory in the target unit, which is the destination. The intermediate unit 110 compares the data length of the received first message with the memory size of the receive memory in the destination target unit and determines whether to divide the received first message.

For example, in the case illustrated in FIG. 3, since the data length of the received first message is equal to or less than the memory size of the receive memory 124*a* in the first target unit 120, which is the destination, the intermediate unit 110 determines not to perform division. Namely, in the embodiment, the intermediate unit 110 determines not to perform division when the data length of the received first message is equal to or less than the memory size of the receive memory in the destination target unit. In this case, as illustrated in FIG. 3, the intermediate unit 110 does not divide the received first message and transmits the received first message to the first target unit 120, which is designated as the destination.

In contrast, in the case illustrated in FIG. 4, since the data length of the received first message is larger than the memory size of the receive memory 134*a* in the second target unit 130, which is the destination, the intermediate unit 110 determines to perform division. Namely, in the embodiment, the intermediate unit 110 determines to perform division when the data length of the received first message is larger than the memory size of the receive memory in the destination target unit.

Upon determining to perform division, the intermediate unit 110 determines the number of divisions based on the data length of the received first message and the memory size of the receive memory in the destination target unit. In the case illustrated in FIG. 4, the intermediate unit 110 divides the data length of the received first message by the memory size of the receive memory 134*a* in the second target unit 130, which is the destination, and sets the number of divisions to the nearest integer obtained by rounding up the obtained quotient. For example, since the data length of the first message received by the intermediate unit 110 is 64 bytes and the memory size of the receive memory 134*a* in the second target unit 130, which is the destination, is 8 bytes, the intermediate unit 110 sets the number of divisions to 8, which is obtained by dividing 64 bytes by 8 bytes.

For example, when the data length of the first message received by the intermediate unit 110 is 20 bytes and the memory size of the receive memory 134*a* in the second target unit 130, which is the destination, is 8 bytes, the intermediate unit 110 sets the number of divisions to 3 because 20 bytes divided by 8 bytes is 2.5. In this case, the intermediate unit 110 may set the data lengths of the first and the second of the first divided messages to 8 bytes and set the data length of the third of the first divided messages to 4 bytes. Alternatively, the intermediate unit 110 may set the data lengths of the first and the second of the first divided messages to 8 bytes and set the data length of the third of the first divided messages to 8 bytes including actual data of 4 bytes and a padding value of 4 bytes.

The intermediate unit 110 successively transmits the multiple first divided messages generated as above to the second target unit 130, which is designated as the destination. For example, the intermediate unit 110 transmits the first of the first divided messages out of the multiple first divided messages generated as above to the second target unit 130, which is designated as the destination. Then, the intermediate unit 110 transmits the subsequent first divided message to the second target unit 130, which is designated as the destination, after a predetermined interval sufficiently long to allow readout of a message of the memory size of the receive memory 134*a* in the second target unit 130. The intermediate unit 110 thereafter repeats the above process until all the first divided messages are transmitted. In response to receiving multiple first divided messages, the second target unit 130 generates a combined message by combining all the received first divided messages and performs a predetermined process based on the combined message.

In this way, in the embodiment, the intermediate unit 110 generates the first divided messages by dividing the first message, which is received from the communication apparatus 200, in a manner appropriate for the type of the destination target unit and transmits the first divided messages to the target unit. Accordingly, the target unit is able to receive a message of a receivable data length appropriate for the memory size of the receive memory in the target unit. Thus, the target unit is able to perform a process appropriate for the content of the first message transmitted from the communication apparatus 200. Since the possibility of hampering the first message from being conveyed as intended may be reduced in this way, the possibility of hampering accurate diagnosis of malfunction from being performed is reduced, enabling improvement in the user's convenience.

A component such as a database is not to be disposed for the communication apparatus 200 to check the memory size of the receive memory in each type of destination target unit. The communication apparatus 200 does not have the functionality such as changing, as a function of the type of the destination target unit, the data length of a first message to be transmitted. Accordingly, without a major change in the design of the communication apparatus 200, the communication apparatus 200 is able to transmit a first message to the target unit irrespective of the type of the destination target unit, that is, irrespective of the memory size of the receive memory in the destination target unit. Thus, the possibility of increasing the design cost may be reduced.

Figure 5:
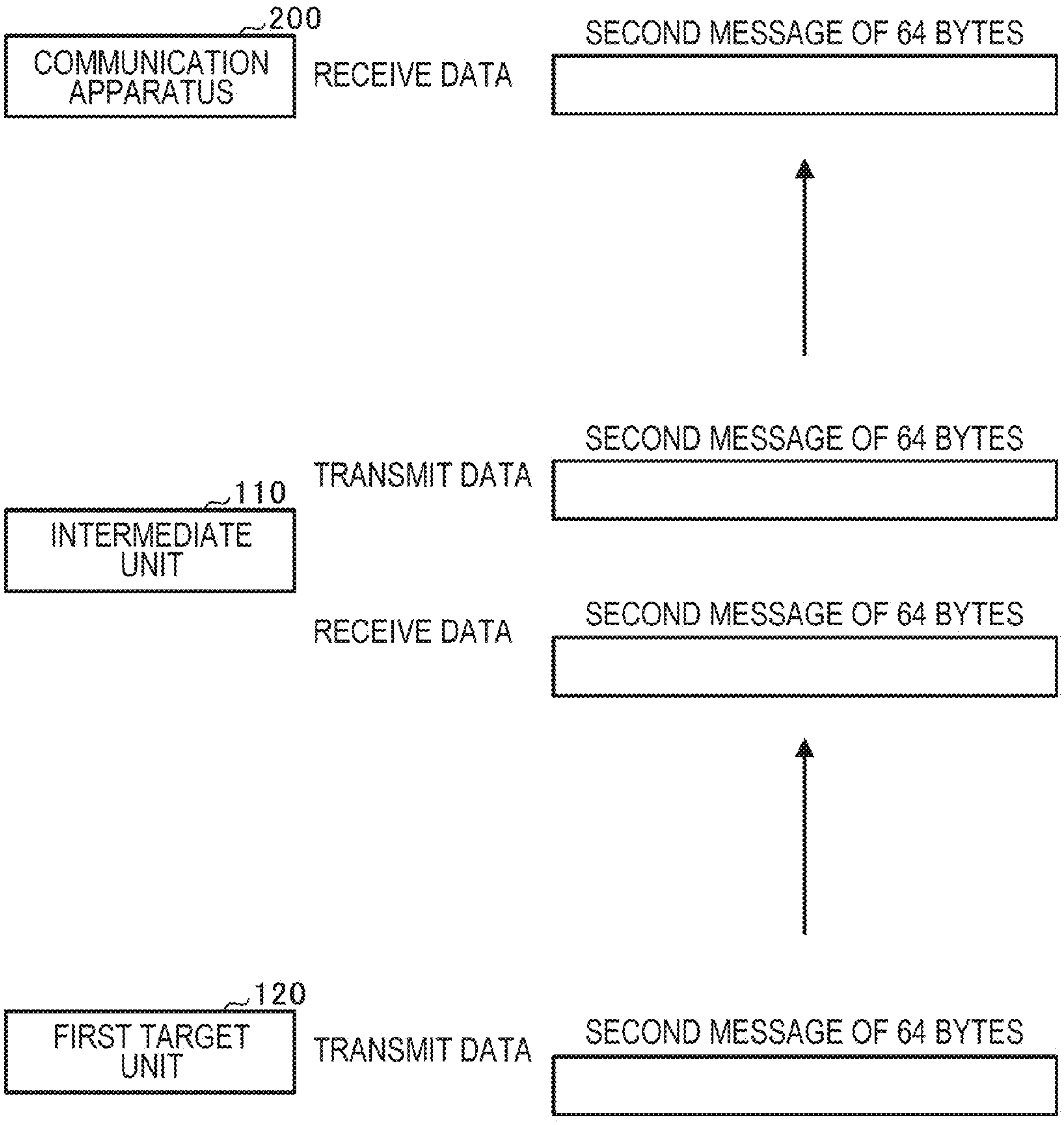
FIG. 5 is an illustration for describing a case where the first target unit transmits a second message to the communication apparatus according to the embodiment of the disclosure.
Figure 6:
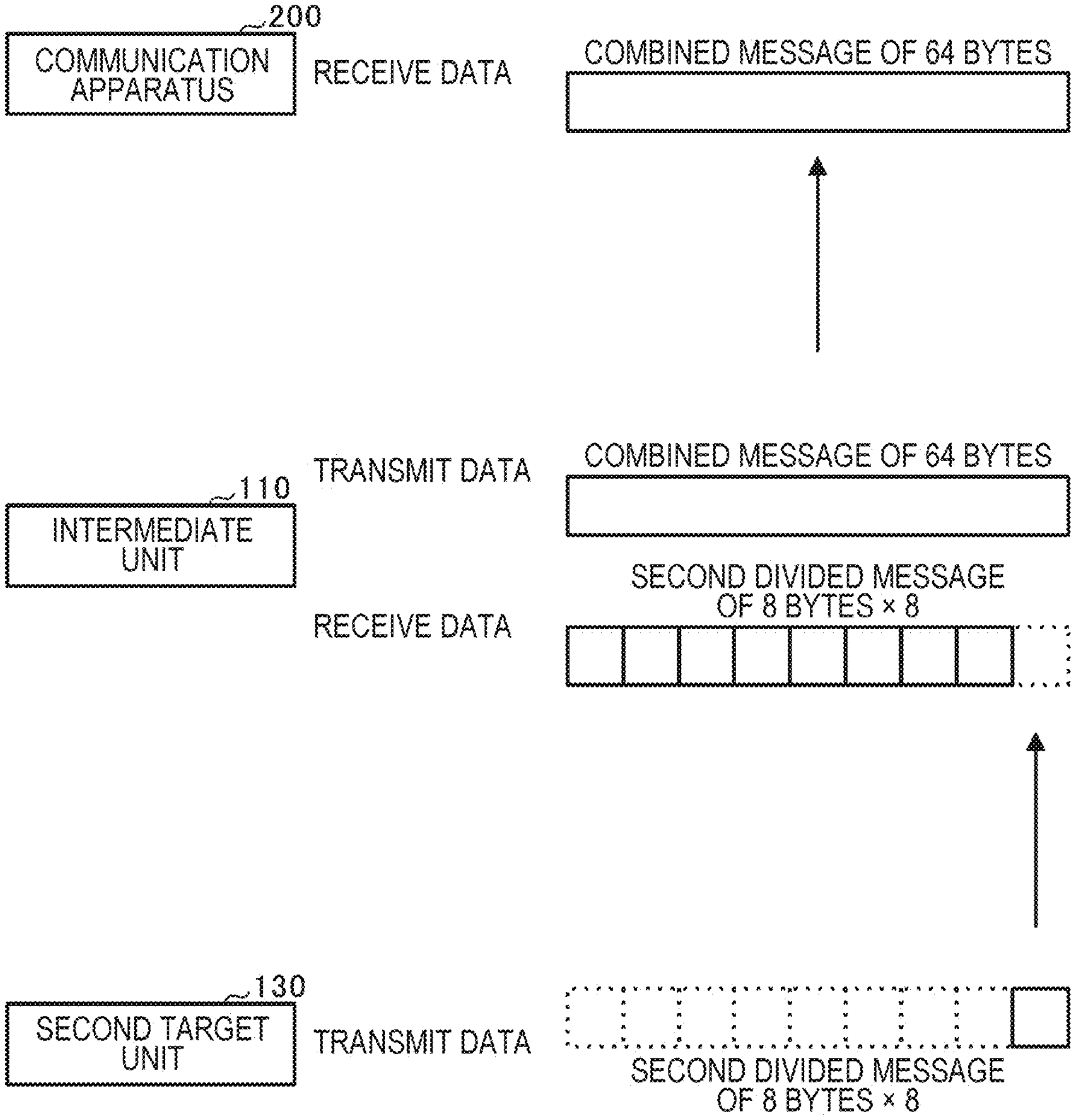
FIG. 6 is an illustration for describing a case where the second target unit transmits second divided messages to the communication apparatus according to the embodiment of the disclosure.

FIG. 5 is an illustration for describing a case where the first target unit 120 transmits a second message to the communication apparatus 200 according to the embodiment of the disclosure. FIG. 6 is an illustration for describing a case where the second target unit 130 transmits second divided messages to the communication apparatus 200 according to the embodiment of the disclosure. It is assumed that the target unit transmits a second message or second divided messages to the communication apparatus 200, which is designated as the destination. In response to receiving a message from the target unit, the intermediate unit 110 determines whether the message received from the target unit is a second message or a second divided message based on the data length indicated by the header information of the message and the data length of the message.

For example, in the case illustrated in FIG. 5, since the data length indicated by the header information of the received message is 64 bytes and the most recently received message has a data length of 64 bytes, the intermediate unit 110 is able to determine that the received message is a second message, which is undivided. In this case, as illustrated in FIG. 5, the intermediate unit 110 transmits the received second message to the communication apparatus 200, which is designated as the destination.

In contrast, in the case illustrated in FIG. 6, since the data length indicated by the header information of the received message is 64 bytes and the most recently received message has a data length of 8 bytes, the intermediate unit 110 is able to determine that the received message is a second divided message that has been subjected to division. In this case, as illustrated in FIG. 6, the intermediate unit 110 waits for other second divided messages to be received and generates a combined message by combining all the received second divided messages in response to receiving all the multiple second divided messages. For example, in response to receiving a second divided message from the second target unit 130, the intermediate unit 110 retains the received second divided message in a predetermined area in the one or more memories 114. Subsequently, the intermediate unit 110 repeatedly retains a received second divided message until all the second divided messages are received. Upon receiving all the second divided messages, the intermediate unit 110 generates a combined message by combining all the received second divided messages.

In the case illustrated in FIG. 6, the intermediate unit 110 is to receive a total of 8 second divided messages each having a data length of 8 bytes and thus is to generate a combined message of 64 bytes by combining these second divided messages.

The intermediate unit 110 transmits the combined message generated as above to the communication apparatus 200, which is designated as the destination. The communication apparatus 200 performs a predetermined process based on the received combined message.

In this way, in the embodiment, in response to receiving second divided messages from the target unit, the intermediate unit 110 generates a combined message by combining the received second divided messages and transmits the combined message to the communication apparatus 200, which is the destination. Consequently, the communication apparatus 200 does not receive multiple second divided messages and thus does not have the functionality such as combining multiple second divided messages. Accordingly, the communication apparatus 200 is able to receive a message from the target unit without a major change in the design of the communication apparatus 200. Thus, the possibility of increasing the design cost may be reduced. Description will be given below with regard to a process performed by the vehicle 100, in particular, a process performed by the intermediate unit 110.

Figure 7:
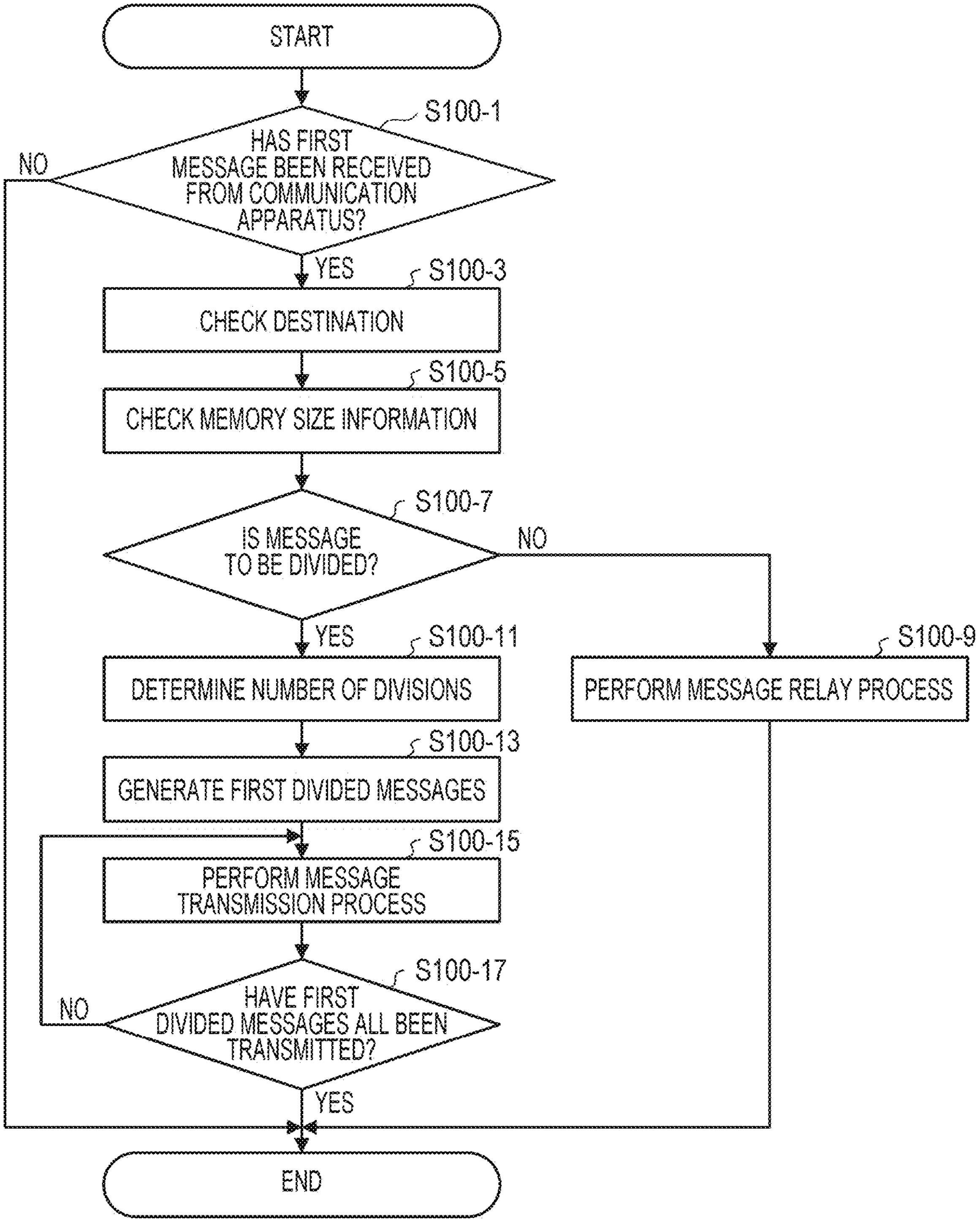
FIG. 7 is a flowchart illustrating a first process on an intermediate unit side according to the embodiment of the disclosure.
Figure 8:
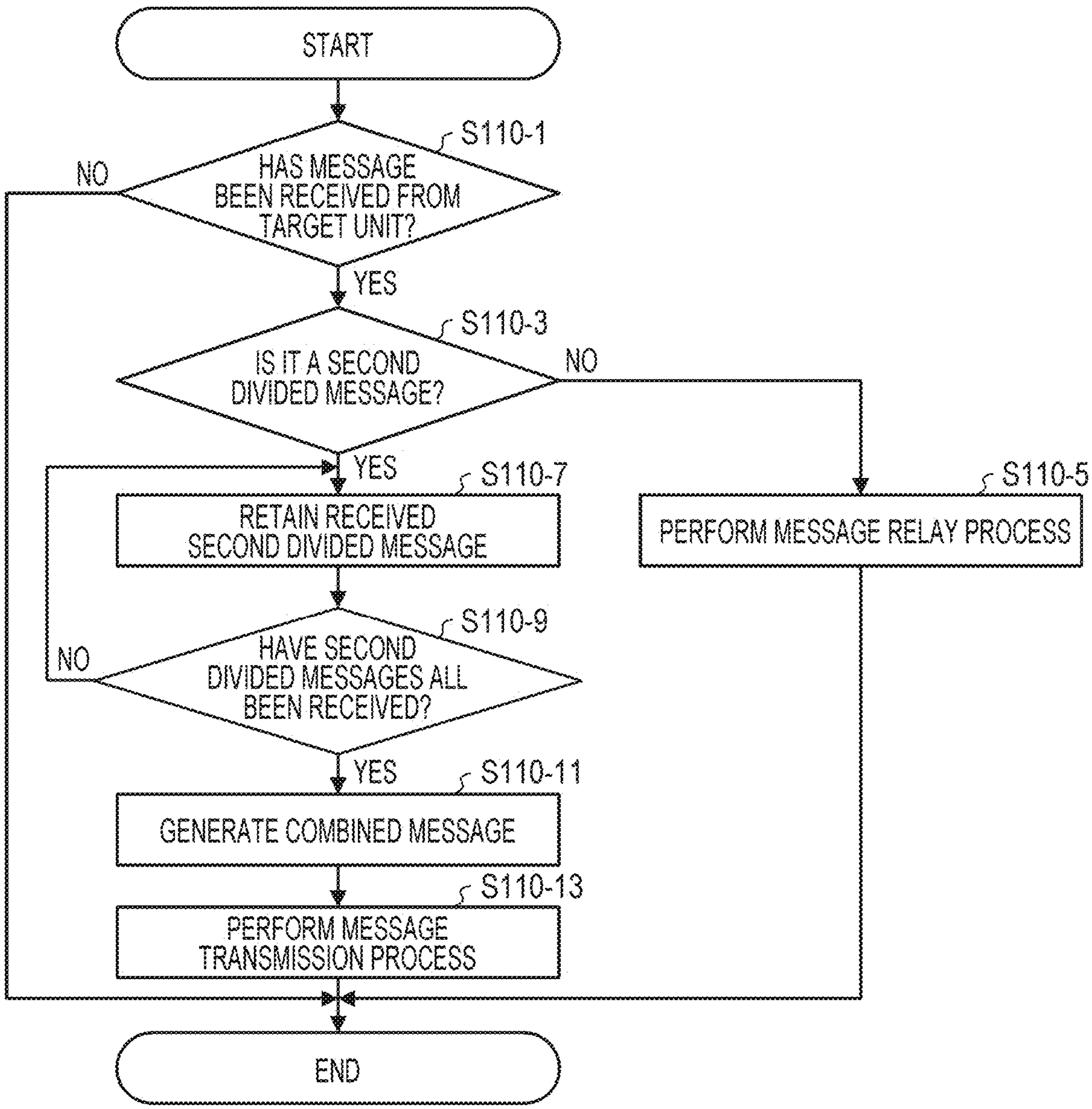
FIG. 8 is a flowchart illustrating a second process on the intermediate unit side according to the embodiment of the disclosure.

FIG. 7 is a flowchart illustrating a first process on an intermediate unit side according to the embodiment of the disclosure. FIG. 8 is a flowchart illustrating a second process on the intermediate unit side according to the embodiment of the disclosure. The first process on the intermediate unit side and the second process on the intermediate unit side are each triggered by an interrupt caused by a timer at predetermined regular intervals. The one or more processors 112 in the intermediate unit 110 may perform various processes including processes described below. In detail, the one or more processors 112 in the intermediate unit 110 execute programs stored in the one or more memories 114 and thereby performs various processes.

As illustrated in FIG. 7, the intermediate unit 110 determines whether a first message has been received from the communication apparatus 200 (step S100-1). If a first message has not been received from the communication apparatus 200 (NO in S100-1), the intermediate unit 110 ends the first process on the intermediate unit side.

If a first message has been received from the communication apparatus 200 (YES in S100-1), the intermediate unit 110 checks the destination of the first message (step S100-3). The intermediate unit 110 also checks the memory size information stored in the one or more memories 114 (step S100-5).

The intermediate unit 110 determines whether to divide the received first message based on the check results in steps S100-3 and S100-5 described above (step S100-7). For example, when the data length of the received first message is larger than the memory size of the receive memory in the target unit that is the destination of the first message, the intermediate unit 110 determines to divide the received first message. When the data length of the received first message is equal to or less than the memory size of the receive memory in the target unit that is the destination of the first message, the intermediate unit 110 determines not to divide the received first message.

If it is determined that the received first message is not to be divided (NO in S100-7), the intermediate unit 110 performs a message relay process in which the received first message is not changed and transmitted at one time to the destination target unit checked in step S100-3 (step S100-9). After performing the message relay process, the intermediate unit 110 ends the first process on the intermediate unit side.

If it is determined that the received first message is to be divided (YES in S100-7), the intermediate unit 110 determines the number of divisions based on the data length of the received first message and the memory size of the receive memory in the destination target unit (step S100-11). For example, the intermediate unit 110 divides the data length of the received first message by the memory size of the receive memory in the destination target unit and sets the number of divisions to the nearest integer obtained by rounding up the obtained quotient.

The intermediate unit 110 generates first divided messages by dividing the received first message based on the number of divisions determined in step S100-11 (step S100-13). The intermediate unit 110 performs a message transmission process of transmitting a first divided message to the destination target unit checked in step S100-3 (step S100-15).

The intermediate unit 110 determines whether all the first divided messages have been transmitted (step S100-17). If at least one first divided message is not transmitted (NO in S100-17), the intermediate unit 110 returns to step S100-15. Then, the intermediate unit 110 performs the message transmission process of transmitting the subsequent first divided message to the target unit (step S100-15). The intermediate unit 110 transmits the subsequent first divided message to the target unit after a predetermined interval sufficiently long to allow readout of a message of the memory size of the receive memory in the destination target unit. In this way, the intermediate unit 110 repeatedly performs the processes in step S100-15 and step S100-17 until all the first divided messages are transmitted.

When all the first divided messages have been transmitted (YES in S100-17), the intermediate unit 110 ends the first process on the intermediate unit side. The intermediate unit 110 is able to successively transmit the first divided messages generated as above to the target unit designated as the destination.

As illustrated in FIG. 8, the intermediate unit 110 determines whether a message has been received from the target unit (step S110-1). If a message has not been received from the target unit (NO in S110-1), the intermediate unit 110 ends the second process on the intermediate unit side.

In response to receiving a message from the target unit (YES in S110-1), the intermediate unit 110 determines based on the data length indicated by the header information of the message and the data length of the most recently received message whether the receiving procedure is completed by the most recently received message or whether a message to be received still remains, in other words, whether a second divided message has been received from the target unit (step S110-3). For example, when the data length indicated by the header information of the received message is 64 bytes and the most recently received message has a data length of 8 bytes, the intermediate unit 110 is able to determine that the received message is a second divided message that has been subjected to division. When the data length indicated by the header information of the received message is 64 bytes and the most recently received message has a data length of 64 bytes, the intermediate unit 110 is able to determine that the received message is a second message, which is undivided.

If the received message is not a second divided message (NO in S110-3), in other words, the received message is a second message and the receiving procedure is completed by the most recently received message, the intermediate unit 110 performs a message relay process in which the received second message is not changed and transmitted at one time to the communication apparatus 200 (step S110-5). After performing the message relay process, the intermediate unit 110 ends the second process on the intermediate unit side.

If the received message is a second divided message (YES in S110-3), in other words, a message to be received still remains, the intermediate unit 110 retains the received second divided message in a predetermined area in the one or more memories 114 (step S110-7).

The intermediate unit 110 determines whether all the second divided messages have been received (step S110-9). If at least one second divided message is not received (NO in S110-9), the intermediate unit 110 returns to step S110-7, and upon receiving the subsequent second divided message, the intermediate unit 110 retains the received second divided message in the predetermined area in the one or more memories 114. In this way, the intermediate unit 110 repeatedly performs the processes from step S110-7 to step S110-9 until all the second divided messages are received.

Upon receiving all the second divided messages (YES in S110-9), the intermediate unit 110 generates a combined message by combining all the second divided messages retained in step S110-7 (step S110-11).

The intermediate unit 110 transmits the combined message generated in step S110-11 to the communication apparatus 200 (step S110-13) and ends the second process on the intermediate unit side.

As described above, a vehicle 100 according to the embodiment is to be coupled to a communication apparatus 200.

The vehicle 100 includes a target unit that is provided to the vehicle 100 and that includes a first target unit 120 and a second target unit 130.

The vehicle 100 includes an intermediate unit 110 that is provided to the vehicle 100 and that is configured to mediate communication between the communication apparatus 200 and the target unit.

The first target unit 120 includes one or more first target unit processors (for example, one or more processors 122) and one or more first target unit memories (for example, one or more memories 124) coupled to the one or more first target unit processors (for example, the one or more processors 122).

The second target unit 130 includes one or more second target unit processors (for example, one or more processors 132) and one or more second target unit memories (for example, one or more memories 134) coupled to the one or more second target unit processors (for example, the one or more processors 132).

The intermediate unit 110 includes one or more intermediate unit processors (for example, one or more processors 112) and one or more intermediate unit memories (for example, one or more memories 114) coupled to the one or more intermediate unit processors (for example, the one or more processors 112).

The one or more first target unit memories (for example, the one or more memories 124) include a first receive memory (for example, a receive memory 124*a*) of a first memory size (for example, 64 bytes).

The one or more second target unit memories (for example, the one or more memories 134) include a second receive memory (for example, a receive memory 134*a*) of a second memory size (for example, 8 bytes) smaller than the first memory size (for example, 64 bytes).

In response to receiving a first message from the communication apparatus 200, the one or more intermediate unit processors (for example, the one or more processors 112) perform a process that includes transmitting the first message to the first target unit 120 without dividing the first message when the destination is the first target unit 120 (in the above embodiment, for example, step S100-1 to step S100-9).

In response to receiving a first message from the communication apparatus 200, the one or more intermediate unit processors (for example, the one or more processors 112) perform a process that includes generating multiple first divided messages obtained by division of the first message and successively transmitting the multiple first divided messages to the second target unit 130 when the destination is the second target unit 130 (in the above embodiment, for example, step S100-1 to step S100-7 and step S100-11 to step S100-17).

In the vehicle 100, such as described in the embodiment, the intermediate unit 110 is able to appropriately divide the first message received by the intermediate unit 110 and transmit the divided messages to the destination target unit. Since the possibility of hampering the first message from being conveyed as intended may be reduced in this way, the possibility of hampering accurate diagnosis of malfunction from being performed is reduced, enabling improvement in the user's convenience.

In response to receiving from the second target unit 130 multiple second divided messages obtained by division of a second message, the one or more intermediate unit processors (for example, the one or more processors 112) may perform a process that includes combining the multiple second divided messages to generate a combined message and transmitting the combined message to the communication apparatus 200 (in the above embodiment, for example, step S110-1, step S110-3, and step S110-7 to step S110-13).

Consequently, the communication apparatus 200 does not receive second divided messages and thus does not have the functionality such as combining second divided messages. Accordingly, the communication apparatus 200 is able to receive a message from the target unit without a major change in the design of the communication apparatus 200. Thus, the possibility of increasing the design cost may be reduced.

The one or more intermediate unit memories (for example, the one or more memories 114) may store memory size information (for example, the memory size information illustrated in FIG. 2) including memory sizes of the first receive memory (for example, the receive memory 124*a*) and the second receive memory (for example, the receive memory 134*a*).

In response to receiving a first message from the communication apparatus 200, the one or more intermediate unit processors (for example, the one or more processors 112) may perform a process that includes determining whether to divide the first message based on the memory size information (for example, the memory size information illustrated in FIG. 2) (in the above embodiment, for example, step S100-1 to step S100-7).

Consequently, a component such as a database is not to be disposed for the communication apparatus 200 to check the memory size of the receive memory in each type of destination target unit. The communication apparatus 200 does not have the functionality such as changing, as a function of the type of the destination target unit, the data length of a first message to be transmitted. Accordingly, without a major change in the design of the communication apparatus 200, the communication apparatus 200 is able to transmit a first message to the target unit irrespective of the type of the destination target unit, that is, irrespective of the memory size of the receive memory in the destination target unit. Thus, the possibility of increasing the design cost may be reduced.

The embodiment of the disclosure has been described above with reference to the attached drawings, but obviously the disclosure is not limited to the embodiment. It is apparent to those skilled in the art that various modifications or alterations are conceivable within the scope described in the claims, and it is to be understood that such modifications or alterations naturally belong to the technical scope of the disclosure.

In the above embodiment, the description has been given with regard to the case where the vehicle 100 is driven by a hybrid drive system by way of illustration and not by way of limitation. The disclosure may be applied to various types of vehicles including a gasoline-driven vehicle, an electric vehicle (EV), a plug-in hybrid electric vehicle (PHEV), a non-plug-in hybrid vehicle (hybrid vehicle).

The series of procedures by the vehicle 100 according to the above embodiment may be achieved by any one of software, hardware, and a combination of software and hardware. A program for implementing software is stored in advance, for example, in a non-transitory medium disposed inside or outside the apparatuses. The program stored, for example, in a non-transitory medium (for example, a ROM) is loaded into a transitory medium (for example, a RAM) and is executed by a processor such as a CPU.

According to the above embodiment, a program may be provided to perform processes for various functions of the vehicle 100. Further, a non-transitory computer-readable medium storing such a program may be provided. Examples of the non-transitory medium include a disc-form recording medium such as an optical disc, a magnetic disc, or a magneto-optical disc and a semiconductor memory such as a flash memory or a universal serial bus (USB) memory.

According to the disclosure, it is possible to enhance convenience in communication between a vehicle and a communication apparatus.

The intermediate unit 110, the first target unit 120, and the second target unit 130 illustrated in FIG. 1 can each be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the intermediate unit 110, the first target unit 120, and the second target unit 130. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle configured to be coupled to a communication apparatus, the vehicle comprising:

a target unit that is provided to the vehicle and that comprises a first target unit and a second target unit; and an intermediate unit that is provided to the vehicle and that is configured to mediate communication between the communication apparatus and the target unit, the communication apparatus being a malfunction diagnosis terminal configured to diagnose malfunction of the vehicle, wherein, the first target unit comprises one or more first target unit processors and one or more first target unit memories coupled to the one or more first target unit processors, the second target unit comprises one or more second target unit processors and one or more second target unit memories coupled to the one or more second target unit processors, the intermediate unit comprises one or more intermediate unit processors and one or more intermediate unit memories coupled to the one or more intermediate unit processors, the one or more first target unit memories comprise a first receive memory of a first memory size, the one or more second target unit memories comprise a second receive memory of a second memory size smaller than the first memory size, and the one or more intermediate unit processors are configured to perform a process comprising:

in response to receiving a first message from the communication apparatus, determining whether to divide the first message based on a destination of the first message and a corresponding memory size of a receive memory of the destination, transmitting the first message to the first target unit without dividing the first message when the destination is the first target unit, and generating first divided messages obtained by division of the first message and successively transmitting the first divided messages to the second target unit when the destination is the second target unit.

2. The vehicle according to claim 1, wherein the one or more intermediate unit processors are configured to perform a process comprising, in response to receiving from the second target unit second divided messages obtained by division of a second message, combining the second divided messages to generate a combined message and transmitting the combined message to the communication apparatus.

3. The vehicle according to claim 2, wherein the one or more intermediate unit memories are configured to store memory size information comprising the first memory size of the first receive memory and the second memory size of the second receive memory, and the one or more intermediate unit processors are configured to perform a process comprising, determining whether to divide the first message based on the memory size information in response to receiving the first message from the communication apparatus.

4. The vehicle according to claim 1, wherein the one or more intermediate unit memories are configured to store memory size information comprising the first memory size of the first receive memory and the second memory size of the second receive memory, and the one or more intermediate unit processors are configured to perform a process comprising, determining whether to divide the first message based on the memory size information in response to receiving the first message from the communication apparatus.

5. The vehicle according to claim 1, wherein the one or more intermediate unit processors are configured to perform a process comprising:

successively transmitting the first divided messages to the second target unit at predetermined intervals.

6. The vehicle according to claim 1, wherein the one or more intermediate unit memories comprise a receive memory having a memory size larger than the first memory size and the second memory size.

7. A vehicle configured to be coupled to a communication apparatus, the vehicle comprising:

a target unit that is provided to the vehicle and that comprises a first target unit and a second target unit; and an intermediate unit that is provided to the vehicle and that is configured to mediate communication between the communication apparatus and the target unit, wherein, the first target unit comprises one or more first target unit processors and one or more first target unit memories coupled to the one or more first target unit processors, the second target unit comprises one or more second target unit processors and one or more second target unit memories coupled to the one or more second target unit processors, the intermediate unit comprises one or more intermediate unit processors and one or more intermediate unit memories coupled to the one or more intermediate unit processors, the one or more first target unit memories comprise a first receive memory of a first memory size, the one or more second target unit memories comprise a second receive memory of a second memory size smaller than the first memory size, and the one or more intermediate unit processors are configured to perform a process comprising:

in response to receiving a first message from the communication apparatus, determining whether to divide the first message based on a destination of the first message and a corresponding memory size of a receive memory of the destination, transmitting the first message to the first target unit without dividing the first message when the destination is the first target unit, and generating first divided messages obtained by division of the first message and successively transmitting the first divided messages to the second target unit when the destination is the second target unit, wherein a data length of the first message is equal to or less than the first memory size of the first receive memory, and the data length of the first message is larger than the second memory size of the second receive memory.

8. A vehicle configured to be coupled to a communication apparatus, the vehicle comprising:

a target unit that is provided to the vehicle and that comprises a first target unit and a second target unit; and an intermediate unit that is provided to the vehicle and that is configured to mediate communication between the communication apparatus and the target unit, wherein, the first target unit comprises one or more first target unit processors and one or more first target unit memories coupled to the one or more first target unit processors, the second target unit comprises one or more second target unit processors and one or more second target unit memories coupled to the one or more second target unit processors, the intermediate unit comprises one or more intermediate unit processors and one or more intermediate unit memories coupled to the one or more intermediate unit processors, the one or more first target unit memories comprise a first receive memory of a first memory size, the one or more second target unit memories comprise a second receive memory of a second memory size smaller than the first memory size, and the one or more intermediate unit processors are configured to perform a process comprising:

in response to receiving a first message from the communication apparatus, determining whether to divide the first message based on a destination of the first message and a corresponding memory size of a receive memory of the destination, transmitting the first message to the first target unit without dividing the first message when the destination is the first target unit, determining a number of divisions based on a data length of the first message and the second memory size of the second receive memory in the second target unit, and generating first divided messages obtained by division of the first message and successively transmitting the first divided messages to the second target unit when the destination is the second target unit.

* * * * *